US012182716B2

(12) United States Patent
Wagner et al.

(10) Patent No.: US 12,182,716 B2
(45) Date of Patent: Dec. 31, 2024

(54) COMPRESSING AND DECOMPRESSING DATA FOR LANGUAGE MODELS

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 908 days.

(21) Appl. No.: 17/002,518

(22) Filed: Aug. 25, 2020

(65) Prior Publication Data
US 2022/0067529 A1    Mar. 3, 2022

(51) Int. Cl.
*G06N 3/084*    (2023.01)
*G06F 40/47*    (2020.01)
*G06N 3/04*    (2023.01)

(52) U.S. Cl.
CPC ............... *G06N 3/084* (2013.01); *G06N 3/04* (2013.01); *G06F 40/47* (2020.01)

(58) Field of Classification Search
CPC .......... G06N 3/084; G06N 3/04; G06N 3/045; G06N 3/063; G06F 40/47
See application file for complete search history.

(56) References Cited

U.S. PATENT DOCUMENTS

2020/0097802 A1    3/2020  Gudovskiy et al.
2021/0295168 A1*   9/2021  Xu .......................... G06F 17/18

OTHER PUBLICATIONS

Park, Junki, et al. "OPTIMUS: OPTImized matrix Multiplication Structure for Transformer neural network accelerator." Proceedings of Machine Learning and Systems 2 (2020): 363-378. (Year: 2020).*
MacAvaney, Sean, et al. "Efficient document re-ranking for transformers by precomputing term representations." Proceedings of the 43rd International ACM SIGIR Conference on Research and Development in Information Retrieval. 2020. (Year: 2020).*
Izacard, Gautier, Armand Joulin, and Edouard Grave. "Lossless Data Compression with Transformer." (Year: 2019).*

(Continued)

*Primary Examiner* — Miranda M Huang
*Assistant Examiner* — Sidney Vincent Bostwick
(74) *Attorney, Agent, or Firm* — Holzer Patel Drennan

(57) ABSTRACT

Embodiments of the present disclosure include systems and methods for compressing and decompressing data generated by sub-blocks in a neural network. In some embodiment, an input matrix is received at a compression block in the neural network. The compression block compresses the input matrix into a compressed matrix and outputs the compressed matrix. The compressed matrix has a reduced dimensionality relative to a dimensionality of the input matrix. A decompression block retrieves the compressed matrix. The decompression block decompresses compressed matrix into a decompressed matrix and outputs the decompressed matrix. The decompressed matrix has a same dimensionality as the dimensionality of the input matrix. The compression and decompression blocks are optimized based on feedback received from the neural network.

16 Claims, 11 Drawing Sheets

(56) References Cited

OTHER PUBLICATIONS

Yu, H. (Jul. 28, 2020). How to teach Transformers to care about word order—Amazon Science. Amazon Science. https://www.amazon.science/blog/how-to-teach-transformers-to-care-about-word-order (Year: 2020).*

MacAvaney, et al., "Efficient Document Re-Ranking for Transformers by Precomputing Term Representations", In Proceedings of the 43rd International ACM SIGIR Conference on Research and Development in Information Retrieval, Jul. 25, 2020, pp. 49-58.

"International Search Report and Written Opinion Issued in PCT Application No. PCT/US21/032838", Mailed Date: Sep. 29, 2021, 13 Pages.

* cited by examiner

COMPRESSING AND DECOMPRESSING DATA FOR LANGUAGE MODELS

BACKGROUND

The present disclosure relates to a computing system. More particularly, the present disclosure relates to techniques for training a neural network.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

DETAILED DESCRIPTION

Figure 1:
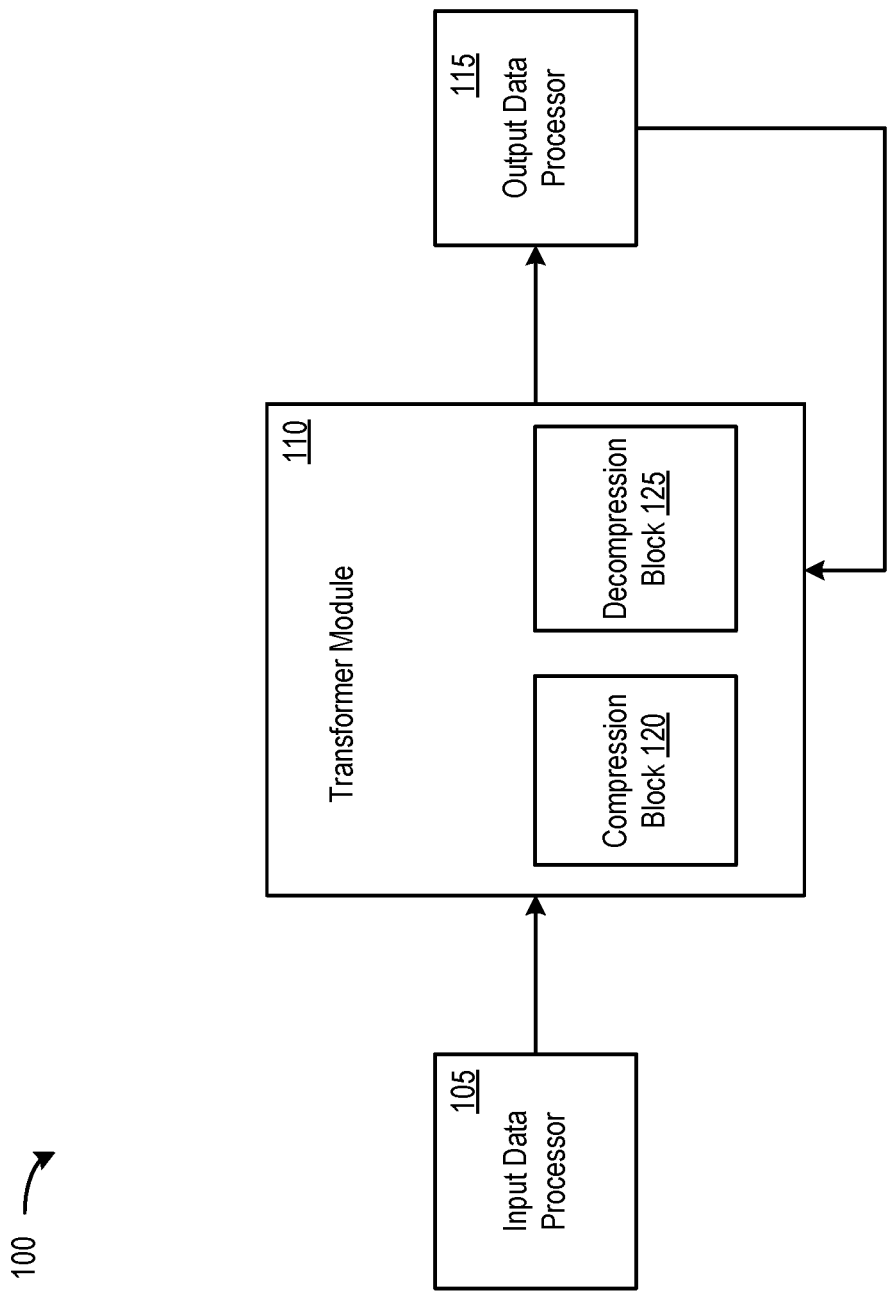
FIG. 1 illustrates a system for training a transformer model according to some embodiments.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described herein are techniques for compressing and decompressing data generated by neural networks used to implement language models. In some embodiments, a first sub-block of a neural network may be configured to output a matrix to a second sub-block of the neural network for processing. Due to a large dimensionality of the matrix, the matrix may be "taken off-chip" to external memory prior to being processed by the second sub-block. Systems and techniques described here provide for a compression block that compresses the matrix prior to being transferred to external memory and a decompression block that decompresses the matrix after it is retrieved from external memory. The compression block and decompression block may be fully connected networks (FCNs) residing in the neural network model. The compression and decompression blocks may be trained during and with training of the neural network. For example, as the neural network is trained with training data, errors may be backpropagated to the compression and decompression blocks. Weights associated with the compression and decompression blocks may be adjusted based on the backpropagated errors.

In some embodiments, the first sub-block outputs an input matrix having dimensions [S, H]. S may represent a sequence length and H may represent a hidden size. The first sub-block may communicate the input matrix to a compression block of the neural network. The compression block may then compress the input matrix into a compressed matrix. The compressed matrix may have a reduced dimensionality. For example, the compressed matrix may have dimensions [S, H/N]. The compressed matrix may then be communicated to an external memory for storage via an input/output (I/O) interface (e.g., "taken off-chip"). Next, the compressed matrix may be retrieved from external memory by a decompression block. The decompression block may then decompress the compressed matrix into a decompressed matrix. The decompressed matrix may have a same dimensionality as the dimensionality of the input matrix. For example, the decompressed matrix may have dimensions [S, H]. The decompression block may output the decompressed matrix, for example, to the second sub-block for processing.

The techniques described in the present application provide a number of benefits and advantages over conventional methods of implementing neural networks for language models. For instance, compressing matrices before they are transmitted for storage in external memory reduces the dimensionality, and thus size, of matrices that are transferred to and from external memory. The compressed matrices utilize less bandwidth when they are transmitted to external memory and take up less storage space when stored in the external memory. As a result, neural networks may be trained and implemented in less time and while utilizing less hardware resources.

FIG. 1 illustrates a system 100 for training a transformer model according to some embodiments. As shown, system 100 includes input data processor 105, transformer module 110, output data processor 115, compression block 120, and decompression block 125. Input data processor 105 is configured to process input data used for training transformer module 110. For example, input data processor 105 may receive a set of input data that includes a sequence of tokens (e.g., a set of words) and a set of position values for the sequence of tokens. A position value may represent the relative position of a particular token in a sequence of tokens. In some cases, a set of input data can also include a set of sentence values. In some embodiments, a sentence value represents a sentence to which a token in the sequence of tokens belongs.

Next, input data processor 105 can select a defined number of tokens in the sequence of tokens or a defined portion of the sequence of tokens (e.g., a percentage of the total number tokens in the sequence). In some embodiments, input data processor 105 selects tokens in the sequence randomly. Input data processor 105 then replaces the selected tokens with a defined token value. The selection and replacement of tokens may also be referred to as token masking. Then, input data processor 105 may select a defined number of position values in the set of position values or a defined portion of the set of position values (e.g., a percentage of the total number position values in the set of position values). In some embodiments, input data processor 105 selects position values in the set of position values randomly. In some embodiments, the defined number or portion used for selecting tokens may be different than the defined number or portion used for selecting position values. Input data processor 105 then replaces the selected position values with a defined position value. The selection and replacement of position values may also be referred to as position masking or position value masking.

After masking tokens and position values in the input data, input data processor 105 may determine token embeddings for each unmasked token in the sequence of tokens using an embedding space generated from a corpus of tokens (e.g., a vocabulary of words). In some embodiments, a token embedding space maps tokens in the corpus, which has many dimension, to numeric representations (e.g., vectors) having a lower number of dimensions. Then, input data processor 105 can determine position embeddings for each unmasked position value in the set of position values using an embedding space generated from a corpus of position values. In some embodiments, a position value embedding space maps position values in the corpus, which has many dimension, to numeric representations (e.g., vectors) having a lower number of dimensions. In cases where the input data includes sentence values, input data processor 105 may determine sentence embeddings for each sentence value in the set of sentence values using an embedding space generated from a corpus of sentence values. In some embodiments, a sentence value embedding space maps sentence values in the corpus, which has many dimension, to numeric representations (e.g., vectors) having a lower number of dimensions. After determining embeddings for tokens, position values, and/or sentence values, input data processor 105 calculates an aggregate embedding for each token in the sequence of tokens by adding the token embedding, the corresponding position value embedding, and/or the corresponding sentence value embedding together. Finally, input data processor 105 sends the aggregate embeddings to transformer module 110 for training.

Transformer module 110 is responsible for predicting masked tokens and masked position values given input data that includes unmasked tokens, masked tokens, unmasked position values, and masked position values. In some embodiments, transformer module 110 is implemented by a transformer neural network (also referred to as a transformer or a transformer model). In some such embodiments, a transformer neural network has a sequence-to-sequence architecture. That is, the transformer neural network can transform a given sequence of elements, such as the sequence of words in a sentence, into another sequence. In some embodiments, the transformer neural network includes weights used for predicting masked tokens and masked positions. The transformer neural network can adjust these weights based on feedback (e.g., differences between predicted tokens for masked tokens and actual values of masked tokens, differences between predicted position values for masked position values and actual values of masked position values, etc.) received from output data processor 115 using a back propagation technique.

Transformer module 110 may determine relationships/correlations between tokens in input data. For instance, transformer module 110 can process tokens in relation to all the other tokens in a sequence, instead of one-by-one in order. In other words, transformer module 110 considers the full context of a token by looking at the tokens that come before and after it. Transformer module 110 may be used for machine translation and search (e.g., conversational queries). Other applications of transformer module 110 include: document summarization, document generation, named entity recognition (NER), speech recognition, and biological sequence analysis.

Compression block 120 is responsible for compressing matrices generated by transformer module 110. For example, as transformer module 110 predicts tokens and position values from given input data, transformer module 110 may generate a number of matrices (e.g., matrices other than those inputted by input data processor 105). At least a portion of these matrices may be compressed by compression block 120 into compressed matrices having a reduced dimensionality relative to the (uncompressed) matrices. For example, if a matrix has a dimensionality of [S, H], compression block 120 may compress the matrix into a compressed matrix having a dimensionality of [S, H/N]. In some embodiments, compressed matrices may be transferred from one or more processors used to implement transformer module 110 to external memory for storage.

In some embodiments, compression block 120 includes weights and biases used to compress matrices. The transformer neural network can adjust these weights and biases based on feedback received from output data processor 115 using a backpropagation technique.

Decompression block 125 is responsible for decompressing matrices. For example, decompression block 125 may decompress matrices into matrices that have an increased dimensionality. In some embodiments, decompression block 125 can decompress matrices into matrices that have the same dimensionality as the dimensionality of matrices used as input to compression block 120. Referring to the above example, decompression block 125 may decompress a compressed matrix having dimensionality [S, H/N] into a decompressed matrix having dimensionality [S, H]. As a result, the dimensionality of the decompressed matrix is the same as the dimensionality of the matrix before compression block 120 compresses it.

In some embodiments, decompression block 125 includes weights and biases used to decompress compressed matrices. The transformer neural network can adjust these weights and biases based on feedback received from output data processor 115 using a backpropagation technique.

Output data processor 115 is configured to process data output from transformer module 110. For example, output data processor 115 can receive an array of data from transformer module 110 and label data. The array of data may include a numeric representation (e.g., the aggregate embedding described above) for each token in a sequence of tokens used as input to transformer module 110. The label data can include values of masked tokens and masked position values in the input data. Next, output data processor 115 identifies the numeric representations of masked tokens in the array of data and determines the predicted tokens for the masked tokens. Output data processor 115 then determines the differences between the predicted tokens for masked tokens and the actual values of the masked tokens specified in the label data. Output data processor 115 performs similar operations for masked position values. That is, output data processor 115 identifies the numeric representations of masked position values in the array of data and determines the predicted position values for the masked position values. Next, output data processor 115 determines the differences between the predicted position values for masked position values and the actual values of the masked position values specified in the label data. Finally, output data processor 115 sends the calculated differences back to transformer module 110 to adjust the weights of transformer module 110. In some embodiments, the calculated differences may be used by transformer module 110 to adjust the weights of compression block 120 and decompression block 125.

In other embodiments, compression block 120 and decompression block 125 may be trained separately from training of other blocks in transformer module 110. For example, compression block 120 and decompression block 125 may be trained using random matrices as training data. Differences between expected compressed matrices and actual compressed matrices may be fed back to compression block 120 to adjust the weights in compression block 120. Differences between expected decompressed matrices and actual decompressed matrices may be fed back to decompression block 125 to adjust the weights in decompression block 125.

Figure 2:
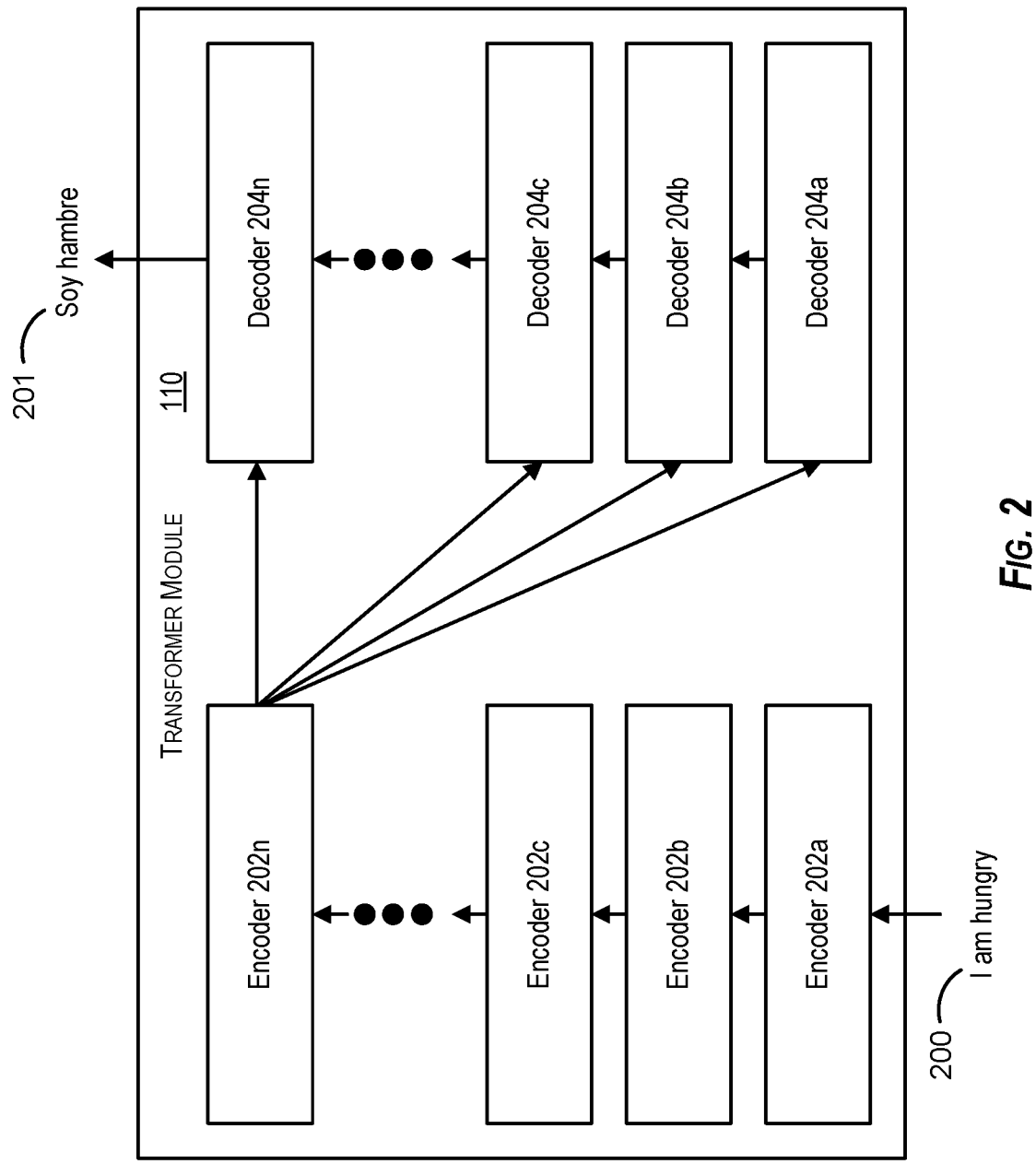
FIG. 2 illustrates an architecture of transformer module according to some embodiments.

FIG. 2 illustrates an architecture of transformer module 110 according to some embodiments. As shown, transformer module 110 includes a plurality of encoders 202a-n and a plurality of decoders 204a-n. Transformer module 110 is shown to take English language input sequence 200 (e.g., "I am hungry") and generate Spanish language output sequence 201 (e.g., "Soy hambre"). In the example shown, input sequence 200 is processed by each of the plurality of encoders 202a-n sequentially. Each of encoders 202a-n may include a self-attention block and a feed-forward neural network. When an encoder processes a given word in input sequence 200, the self-attention block may enable the encoder to look at other words in input sequence 200. The feed-forward neural network may then process and forward the output of the self-attention block to the next encoder in the plurality of encoders 202a-n. A set of attention vectors may be generated from the output of the final encoder in the plurality of encoders 202a-n (e.g., encoder 202n). This set of attention vectors may be communicated to each of the plurality of decoders 204a-n.

Similar to the plurality of encoders 202a, each of the plurality of decoders 204a-n includes a self-attention block and a feed feed-forward neural network. In addition, each of the plurality of decoders 204a-n may include an encoder-decoder attention block. The encoder-decoder attention block enables each of the plurality of decoders 204a-n to attend to appropriate positions of input sequence 200 during processing. Decoder 204n may output a matrix of floating point numbers. Transformer module 110 may convert this matrix into natural language output sequence 201.

Figure 3A:
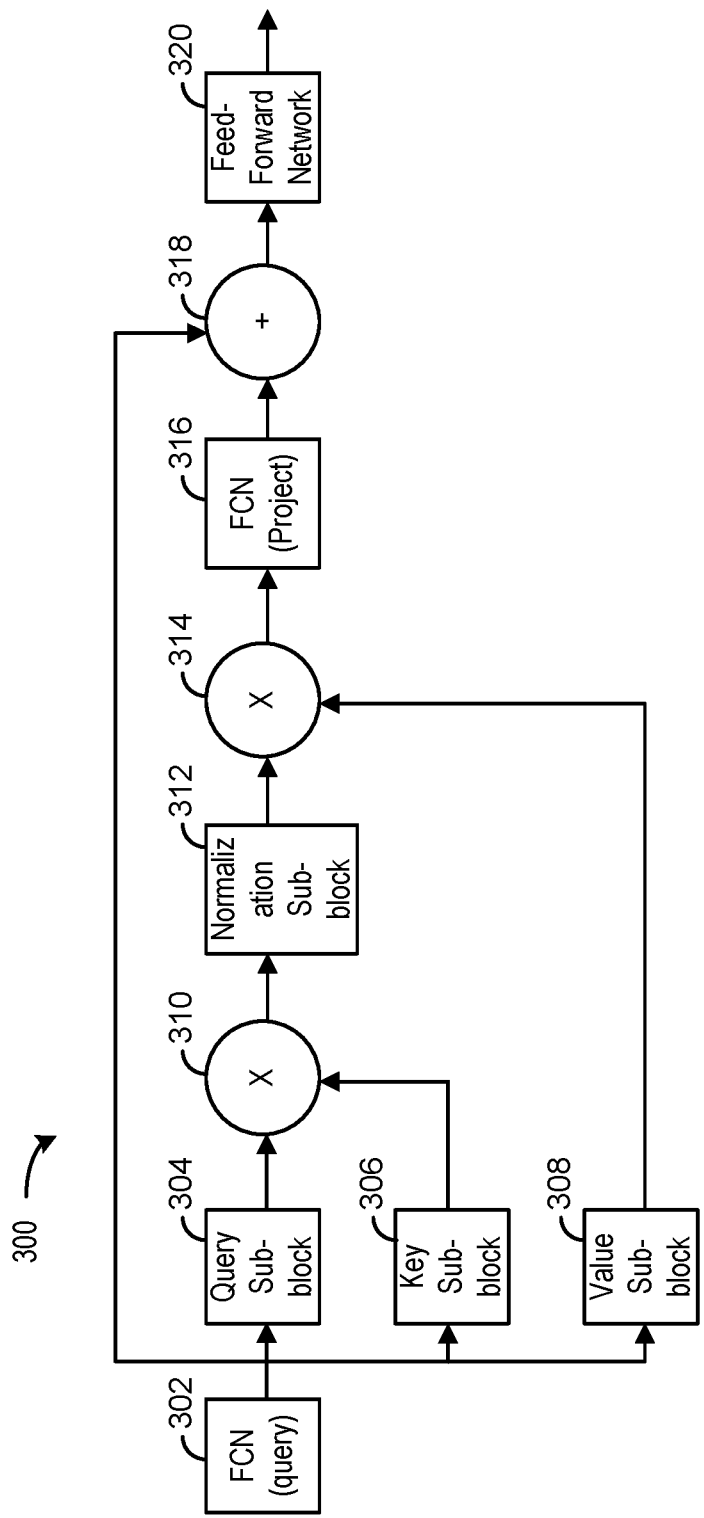
FIG. 3A illustrates an example architecture of a neural network according to some embodiments.

FIG. 3A illustrates an example architecture of neural network 300 according to some embodiments. Neural network 300 may be included in any of the plurality of encoders 202a-n or the plurality of decoders 204a-n. As shown, neural network 300 includes fully connected network (FCN) query sub-block 302, query sub-block 304, key sub-block 306, value sub-block 308, operator sub-block 310, normalization sub-block 312, operator sub-block 314, FCN projection sub-block 316, layer normalization sub-block 318, and feed-forward network 320.

FCN query sub-block 302 is shown to communicate with query sub-block 304, key sub-block 306, and value sub-block 308, as well as layer normalization sub-block 318. In NLP applications, FCN query sub-block 302 may communicate a matrix that embeds an input sequence such as natural language input sequence 200. Query sub-block 304 is configured to generate a query matrix from the matrix received from the FCN query sub-block 302. In some embodiments, the query matrix may include current position-word vectors in the input sequence. Query sub-block 304 may generate the query matrix by multiplying the received matrix with a weight matrix. Query sub-block 304 outputs the query matrix to operator sub-block 310.

Key sub-block 306 is configured to generate a key matrix from the matrix received from the FCN query sub-block 302. In some embodiments, the key matrix may include all the position-word vectors in the input sequence. Key sub-block 306 may generate the key matrix by multiplying the received matrix with a weight matrix. Key sub-block 306 outputs the key matrix to operator sub-block 310.

Operator sub-block 310 serves to generate an attention weight matrix based on the query matrix outputted by the query sub-block 304 and the key matrix outputted by the key sub-block 306. In some embodiments, the attention weight matrix may represent how much particular inputs in the input sequence relate to other inputs in the input sequence. In some embodiments, the operator sub-block 310 may perform a dot product on the query matrix and a transpose of the key matrix to generate the attention weight matrix. Operator sub-block 310 communicates the attention weight matrix to normalization sub-block 312.

Normalization sub-block 312 serves to generate a normalized attention weight matrix by normalizing the attention weight matrix outputted by operator sub-block 310. Normalization sub-block 312 may use a SoftMax operation to scale the weights values in attention weight matrix to values that are between 0 and 1. Normalization sub-block 312 outputs the normalized attention weight matrix to operator sub-block 314.

Value sub-block 308 is configured to generate a value matrix from the matrix received from FCN query sub-block 302. In some embodiments, the value matrix may include all the position-word vectors in the input sequence. Value sub-block 308 may generate the value matrix by multiplying the received matrix with a weight matrix. Value sub-block 308 outputs the value matrix to operator sub-block 314.

Operator sub-block 314 serves to generate a weighted value matrix based on the normalized attention weight matrix received from normalization sub-block 312 and the value matrix received from value sub-block 308. In some embodiments, the weighted value matrix represents how different positions of the input sequence relate to one another. In some embodiments, operator sub-block 314 performs a dot product on the normalized attention weight matrix and the value matrix. Operator sub-block 314 outputs the weighted value matrix to FCN projection sub-block 316.

FCN projection sub-block 316 is configured to perform projection operations on the weighted value matrix received from operator sub-block 314. FCN projection sub-block 316 communicates its output to layer normalization sub-block 318.

Layer normalization sub-block 318 is responsible for aggregating matrices outputted by FCN query sub-block 302 and FCN projection sub-block 318 and normalizing the resulting aggregation. Layer normalization sub-block 318 communicates its output to feed-forward network 320.

Feed-forward network 320 is responsible for implementing a feed-forward neural network and outputting a resulting matrix to the next layer. For example, feed-forward network 320 may communicate the resulting matrix with a subsequent encoder in plurality of encoders 202a-n or a subsequent decoder in plurality of decoders 204a-n. In some embodiments, the feed-forward neural network performs non-linear transformations on the output of layer normalization sub-block 318.

Figure 3B:
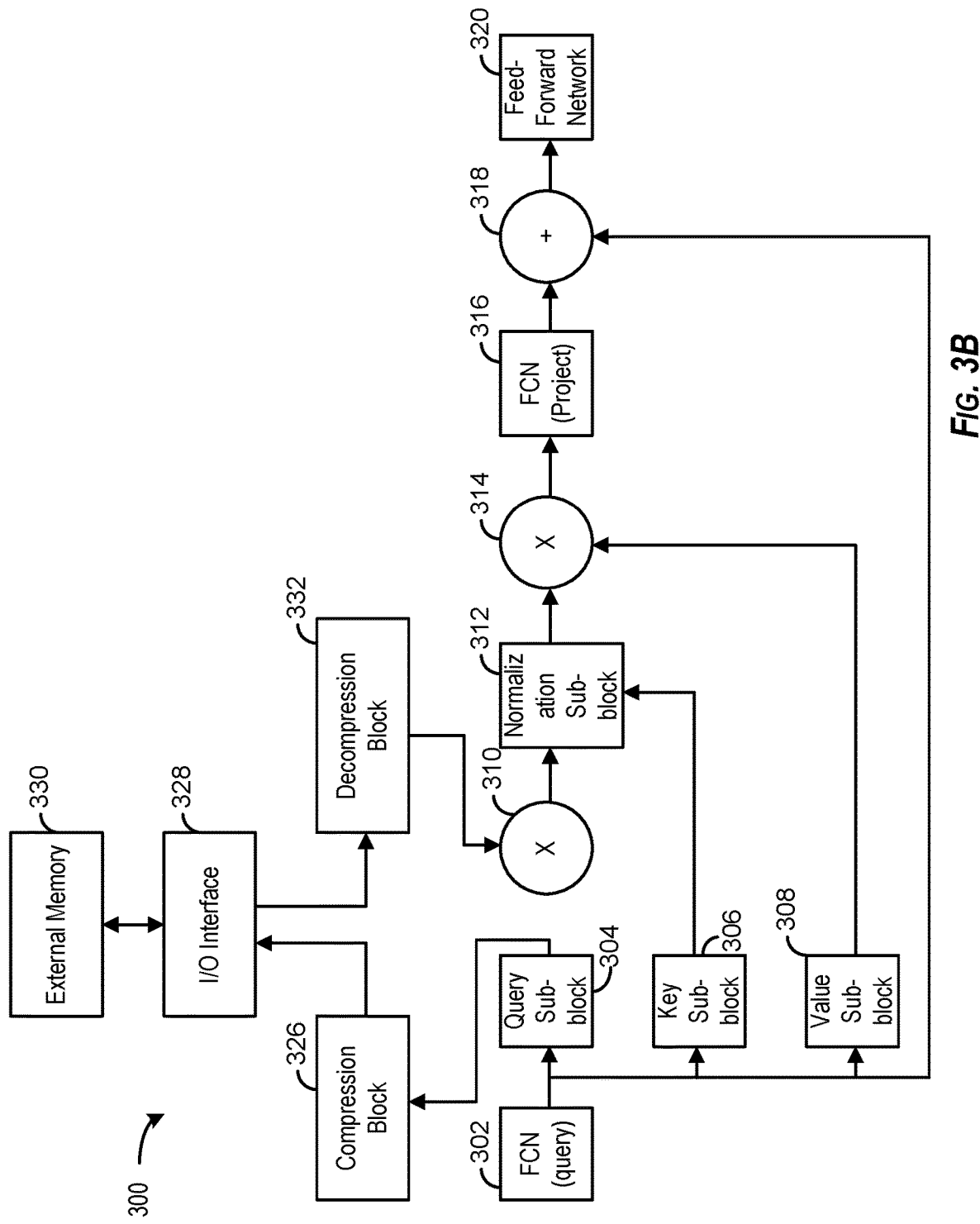
FIG. 3B illustrates an example architecture of a neural network implementing a compression block and a decompression block according to some embodiments.

FIG. 3B illustrates an example architecture of neural network 300 implementing compression block 326 and decompression block 332 according to some embodiments. As noted above, query sub-block 304 generates a query matrix. A query matrix may have dimensions [S, H], where S represents a sequence length and H represents a hidden size. In certain embodiments, either of S or H may have a size of 512, 1024, 2048, or 4096, etc. floating point numbers. As a result, a query matrix may have dimensions of up to 4096×4096 or even higher. Data encoding matrices of these dimensions may be required to be "taken off-chip" due to their size. For example, a 4096×4096 matrix of floating point numbers may use 536,870,912 bits or more to encode. In certain embodiments, these matrices are transferred to external memory 330 via an I/O interface 328. I/O, read, and write operations associated with transferring these matrices may add to an overall time it takes to generate an output sequence from an input sequence (e.g., perform a translation). Compressed matrices comprise fewer floating point numbers owing to their reduced dimensionality relative to the input matrices (e.g., query and key matrices). As a result, less data is required to encode compressed matrices. This results in faster I/O, read, and write operations associated with transferring compressed matrices to and from external memory 330 as compared to uncompressed input matrices.

As used herein, external memory 330 refers to off-chip memory such as primary memory (e.g., random access memory (RAM)) or secondary memory (non-volatile storage such as disk drives or solid-state drives). Off-chip memory is referred to in contrast to on-chip memory, which comprises cache memory that is generally smaller in size than off-chip memory. When implementing the query sub-block 304 to generate the query matrix, for example, a processor may use on-chip memory for certain operations. After generating the query matrix or portions of it, the processor may transfer the query matrix to be written to off-chip memory. Once stored in off-chip memory, the query matrix may then be retrieved when it is processed by a subsequent sub-block (e.g., operator sub-block 310). A time it takes to transfer the query matrix off and on-chip will thus depend on a size of the query matrix due to I/O bandwidth limitations and read/write speeds.

As shown in FIG. 3B, query sub-block 304 communicates with compression block 326. For example, query sub-block 304 may communicate query matrices to compression block 326. Compression block 326 serves to compress input matrices (e.g., query matrices) into compressed matrices having a reduced dimensionality in at least one dimension relative to a dimensionality of the input matrices. For example, given an input matrix having dimensions [S, H], compression block 326 may compress the input matrix in its H dimension. In this example, compression block 326 may generate a compressed matrix having dimensions [S, H/N], where H/N is less than H. In another example, compression block 326 may compress the input matrix in its S dimension. In this example, compression block 326 may generate a compressed matrix having dimensions [S/N, H], where S/N is less than S. In both examples, compression block 326 compresses the input matrix into a compressed matrix having a reduced dimensionality compared to its dimensionality prior to compression. As shown, compression block 326 outputs compressed matrices to external memory 330 via I/O interface 328 for temporary storage.

Decompression block 332 serves to decompress compressed matrices into decompressed matrices having a same dimensionality as the dimensionality of the input matrix. Decompression block 332 retrieves compressed matrices from external memory 330 via I/O interface 328. Next, decompression block 332 decompresses these compressed matrices into decompressed matrices. For example, given a compressed matrix having dimensions [S, H/N], decompression block 332 decompresses this compressed matrix into a decompressed matrix having dimensions [S, H]. In another example, given a compressed matrix having dimensions [S/N, H], decompression block 332 decompresses this compressed matrix into decompressed matrix having dimensions [S, H]. As a result, decompressed matrix has a same dimensionality as the dimensionality of input matrix. Decompression block 332 then communicates decompressed matrices to operator sub-block 310.

Although not shown in FIG. 3B, compression block 326 and decompression block 332 may be used to compress and decompress matrices generated by sub-blocks other than query sub-block 304. Examples include matrices generated by FCN query sub-block 302, key sub-block 306, value sub-block 308, operator sub-block 310, normalization sub-block 312, operator sub-block 314, FCN projection sub-block 316, layer normalization sub-block 318, and feed-forward network 320.

Figure 4:
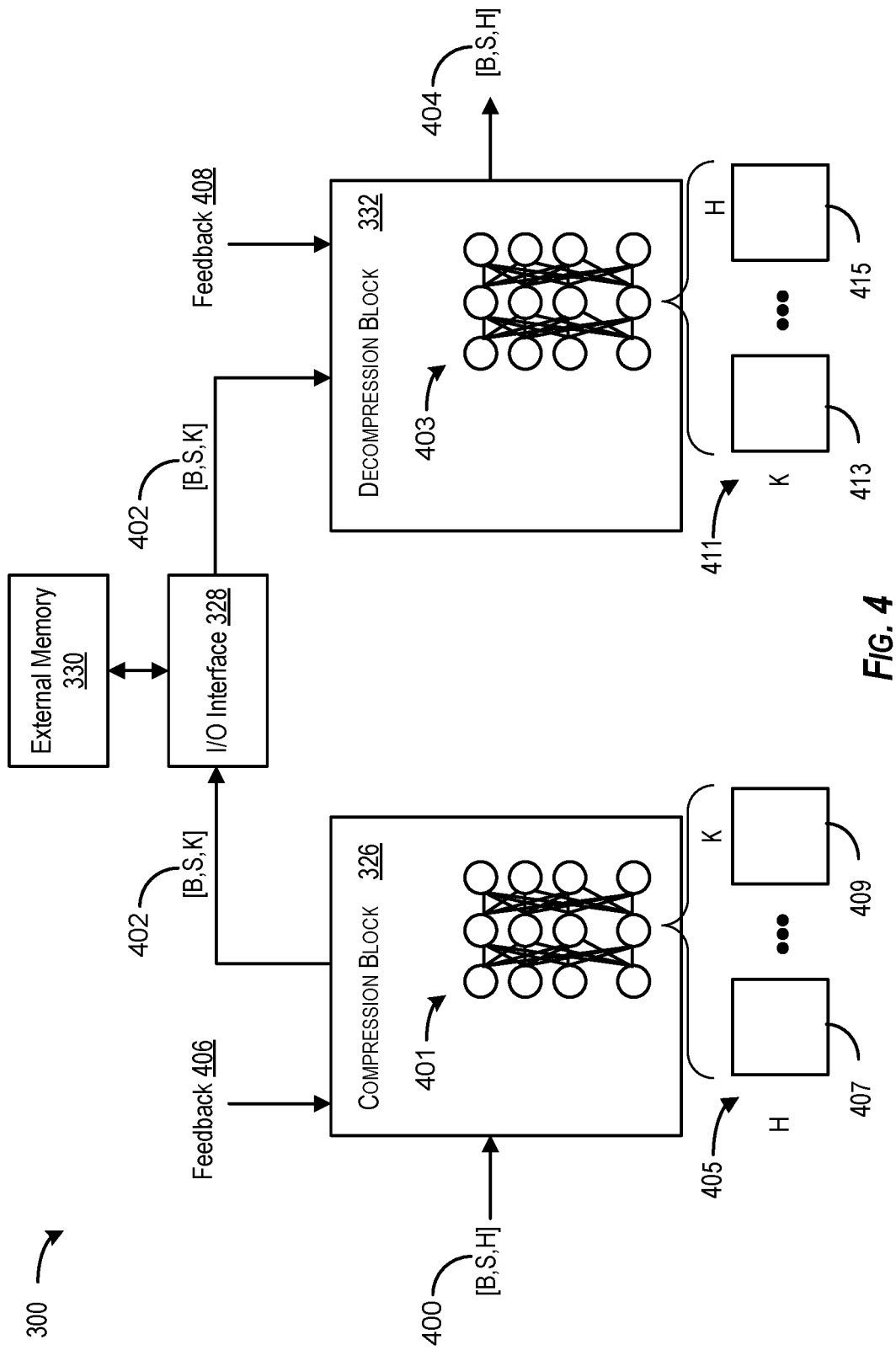
FIG. 4 illustrates an example compression and decompression process performed by a compression block and a decompression block, respectively, according to some embodiments.

FIG. 4 illustrates an example compression and decompression process performed by compression block 326 and decompression block 332, respectively, according to some embodiments. Compression block 326 is shown to include FCN 401. In the embodiment shown, FCN 401 is implemented by a set of matrices 405, which includes matrix 407 and matrix 409. Input matrix 400 is shown to have dimensions [B, S, H], where B represents a batch size (e.g., a number of sentences), where S represents a sequence length (e.g., sentence length), and where H represents a hidden size (e.g., a size of word embedding). Compression block 326 compresses input matrix 400 into compressed matrix 402 having dimensions [B, S, K]. Decompression block 332 is shown to include FCN 403. In the embodiment shown, FCN 403 is implemented by a set of matrices 411, including matrix 413 and matrix 415. Decompression block 332 decompresses compressed matrix 402 into decompressed matrix 404 having dimensions [B, S, H].

FCN 401 is a fully connected network comprising a series of fully connected layers (e.g., each node in one layer is connected to every node in the next layer). FCN 401 is implemented by the set of matrices 405. In particular, connections between nodes of FCN 401 are represented by weights in the set of matrices 405. When compression block 326 receives feedback 406 (e.g., via backpropagation during a training stage), compression block 326 may adjust the weights in the set of matrices 405. As a result, the compression block 326 learns to optimize its compression based on feedback 406 (e.g., reduce information loss resulting from the compression-decompression processes).

Compression block 326 compresses input matrix 400 into compressed matrix 402 by multiplying input matrix 400 with the set of matrices 405. In the example shown, compression block 326 multiplies input matrix 400 by matrix 407 first and by matrix 409 last. In some embodiments, a number of columns in the input matrix 400 is equal to a number of rows in matrix 407. In the example shown, input matrix 400 has H columns and matrix 407 has H rows. Matrix 409 in the set of matrices 405 is shown to have K columns. As a result, compressed matrix 402 has K columns. Compression block 326 next outputs compressed matrix 402 to external memory 330 via I/O interface 328.

Decompression block 332 retrieves compressed matrix 402 from external memory 330 via I/O interface 328. Next, decompression block 332 decompresses compressed matrix 402 into decompressed matrix 404. In the example shown, decompression block 332 decompresses compressed matrix 402 having dimensions [B, S, K] into decompressed matrix 404 having dimensions [B, S, H]. As a result, decompressed matrix 404 has a same dimensionality as the dimensionality of input matrix 400.

FCN 403 of decompression block 332 is a fully connected network. FCN 403 is implemented by a set of matrices 411. Connections between nodes of FCN 403 are represented by weights in the set of matrices 411. When decompression block 332 receives feedback 408, decompression block 332 may adjust the weights in the set of matrices. As a result, decompression block 332 learns to optimize its decompression based on feedback 408 (e.g., reduce information loss resulting from compression-decompression processes).

Decompression block 332 decompresses compressed matrix 402 by multiplying compressed matrix 402 with the set of matrices 411. In the example shown, decompression block 332 multiplies compressed matrix 402 by matrix 413 first and by matrix 415 last. In some embodiments, a number of columns of compressed matrix 402 is equal to a number of rows in matrix 413. In the example shown, compressed matrix 402 has K columns and matrix 413 has K rows. Matrix 415 in the set of matrices 411 is shown to have H columns. As a result, decompressed matrix 404 has H columns.

As noted above, matrices used to encode input sequences may be as large as 4096×4096 floating point numbers. In some embodiments, matrices of this size may be too large for a processor to handle when implementing various sub-blocks. For example, a 4096×4096 matrix may be too large for the processor to run through the query sub-block 304. This is because it may be impracticable to perform certain matrix multiplication operations on a 4096×4096 matrix as may be instructed by query sub-block 304. In certain embodiments, matrices such as these are split into component matrices prior to their being run through sub-blocks. In these embodiments, component matrices may be processed individually by the sub-blocks. Next, the sub-blocks may output the component matrices individually to compression block 326 for compression. Compression block 326 may then compress these component matrices individually. An example of this process is described with reference to FIG. 5.

Figure 5:
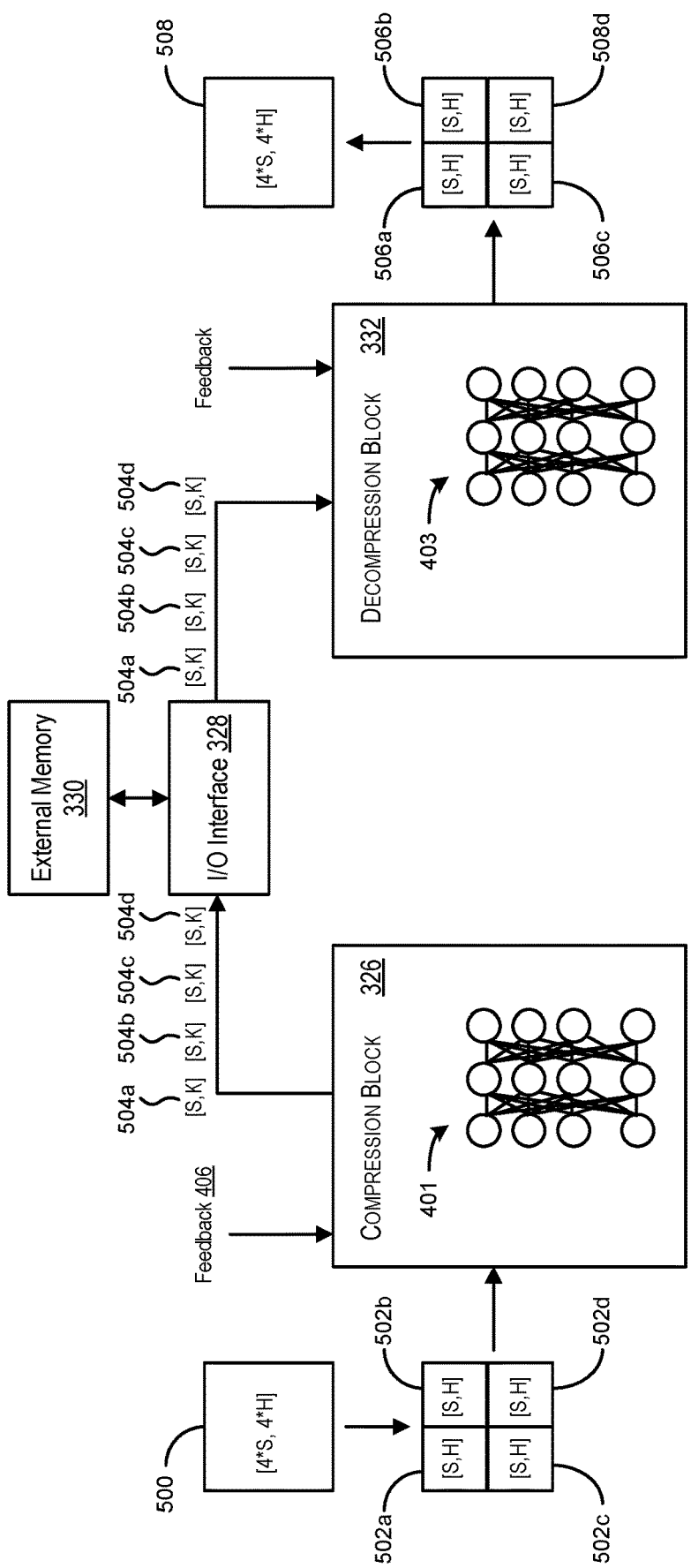
FIG. 5 illustrates another example compression and decompression process by a compression block and a decompression block, respectively, according to some embodiments.

FIG. 5 illustrates another example compression and decompression process by compression block 326 and decompression block 332, respectively, according to some embodiments. In this example, input matrix 500 is shown to have dimensions [4*S, 4*H] (dimension B is not shown for clarity). Input matrix 500 is shown to be split into four component matrices 502a-d each having dimensions [S, H]. Each of the four component matrices 502a-d may then be individually compressed by compression block 326 into corresponding compressed component matrices 504a-d. In the example shown, each of the compressed component matrices 504a-d has dimensions [S, K]. Compressed component matrices 504a-d are then transferred to external memory 330 for storage. Although input matrix 500 is shown to be split into four equally dimensioned component matrices 502a-d, other splitting schemes are possible.

Decompression block 332 retrieves compressed component matrices 504a-d from external memory 330. Decompression block 332 may individually decompress compressed component matrices 504a-d into decompressed component matrices 506a-d. In the example shown, decompression block 332 decompresses compressed component matrices 504a-d each having dimensions [S, K] into decompressed component matrices 506a-d each having dimensions [S, H]. Next, decompressed component matrices 506a-d are concatenated to form decompressed matrix 508 having dimensions [4*S, 4*H]. Decompressed matrix 508 is then communicated to a subsequent sub-block for processing.

Figure 6:
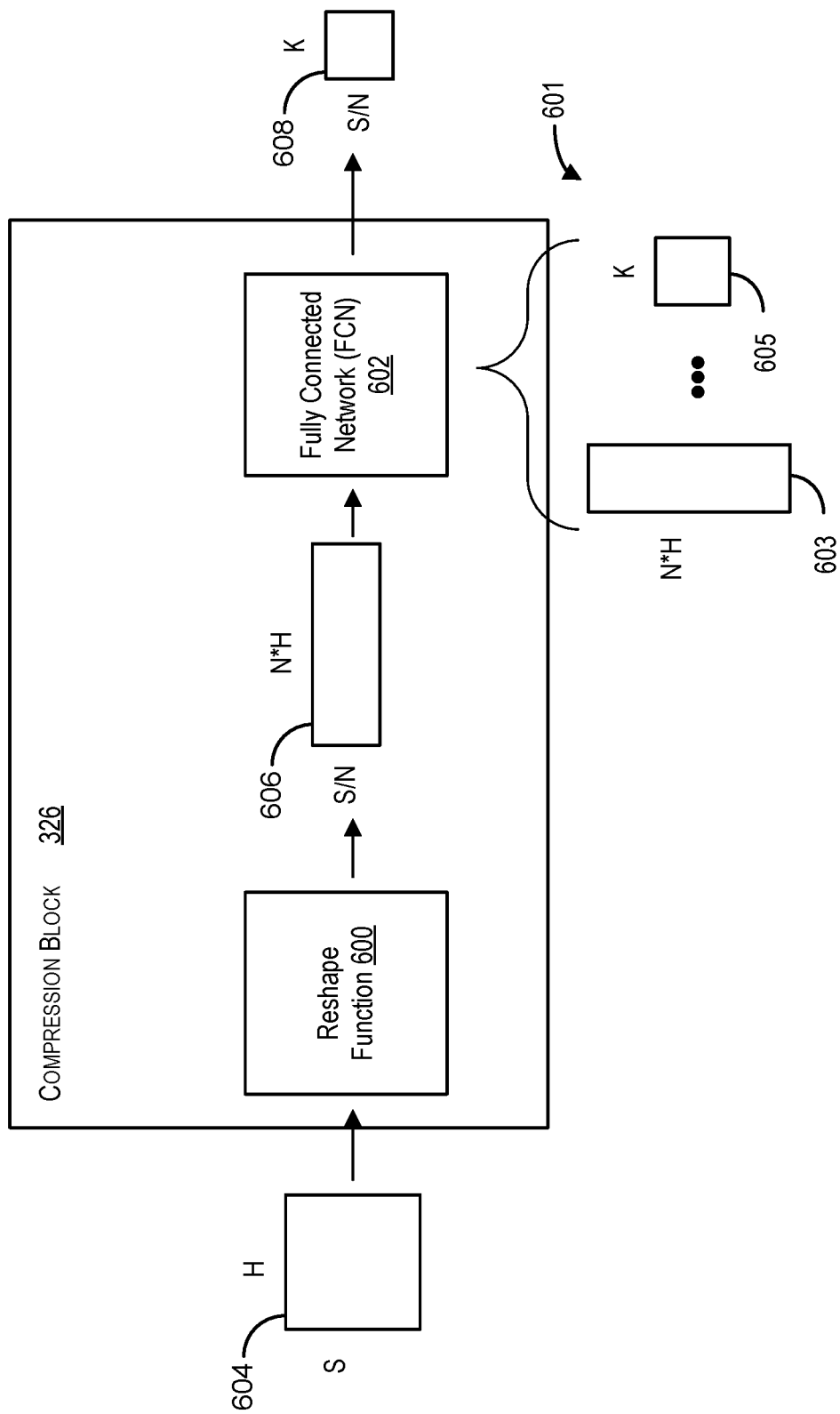
FIG. 6 shows an example compression operation performed by a compression block according to some embodiments.

FIG. 6 shows an example compression operation performed by compression block 326 according to some embodiments. Compression block 326 includes a reshape function 600 and FCN 602. Reshape function 600 is configured to reshape input matrices. In particular, reshape function 600 reshapes input matrices such that a number of columns in the input matrices is equal to a number of rows in matrix 603 of set of matrices 601.

As shown in FIG. 6, input matrix 604 has dimensions [S, H] while matrix 603 in the set of matrices 601 has N*H rows where N does not equal 1. Thus, the number of columns in input matrix 604 does not match the number of rows in matrix 603 of the set of matrices 603. Reshape function 600 reshapes input matrix 604 into reshaped matrix 606. Reshaped matrix 606 has dimensions [S/N, N*H] and therefore has a number of columns that matches a number of rows in matrix 603. Next, compression block 326 multiplies reshaped matrix 606 with the set of matrices 601, beginning with matrix 603 and ending with matrix 605. Matrix 605 is shown to have K columns where K is less than N*H. The resulting product is compressed matrix 608 having dimensions [S/N, K], which is outputted by decompression block 332.

Figure 7:
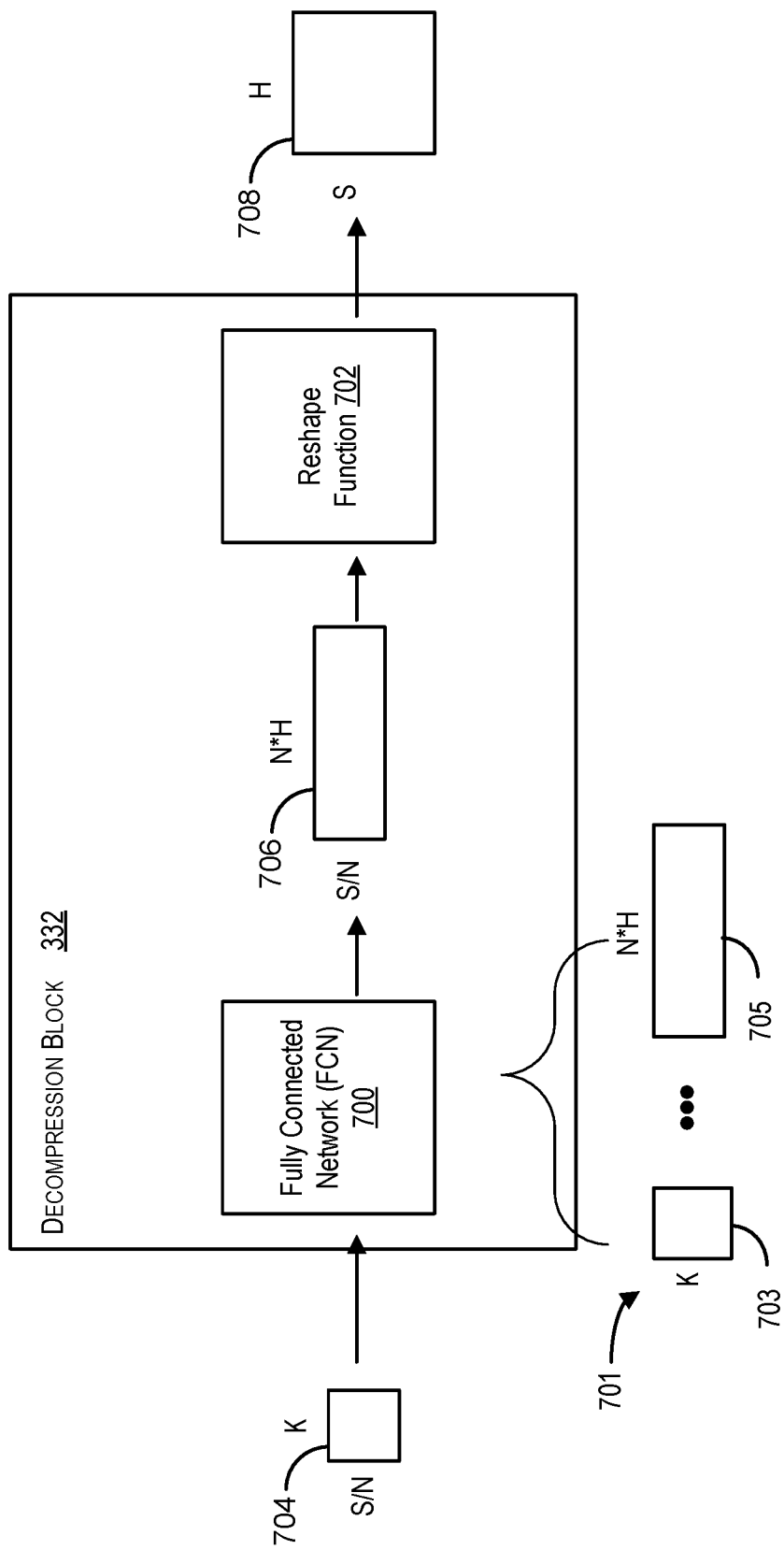
FIG. 7 shows an example decompression operation performed by a decompression block according to some embodiments.

FIG. 7 shows an example decompression operation performed by decompression block 332 according to some embodiments. Decompression block 332 includes FCN 700 and reshape function 702. Reshape function 702 serves to reshape decompressed matrices. In particular, reshape function 702 ensures that a dimensionality of reshaped decompressed matrices matches a dimensionality of input matrices (e.g., prior to being processed by compression block 326). For example, reshape function 702 may reshape decompressed matrices so that reshaped decompressed matrices have a number of rows and columns that is the same as a number of rows and columns of input matrices.

As shown in FIG. 7, compressed matrix 704 has dimensions [S/N, K]. Compressed matrix 704 may be compressed matrix 608 shown in FIG. 6. When decompression block 332 retrieves compressed matrix 704, decompression block 332 multiplies compressed matrix 704 with set of matrices 701, beginning with matrix 703 and ending with matrix 705. The resulting product is decompressed matrix 706 having dimensions [S/N, N*H]. Next, reshape function 702 reshapes decompressed matrix 706 into reshaped decompressed matrix 708. Reshaped decompressed matrix 708 is shown to have dimensions [S, H], which is the same as the dimensions of input matrix 604.

Figure 8:
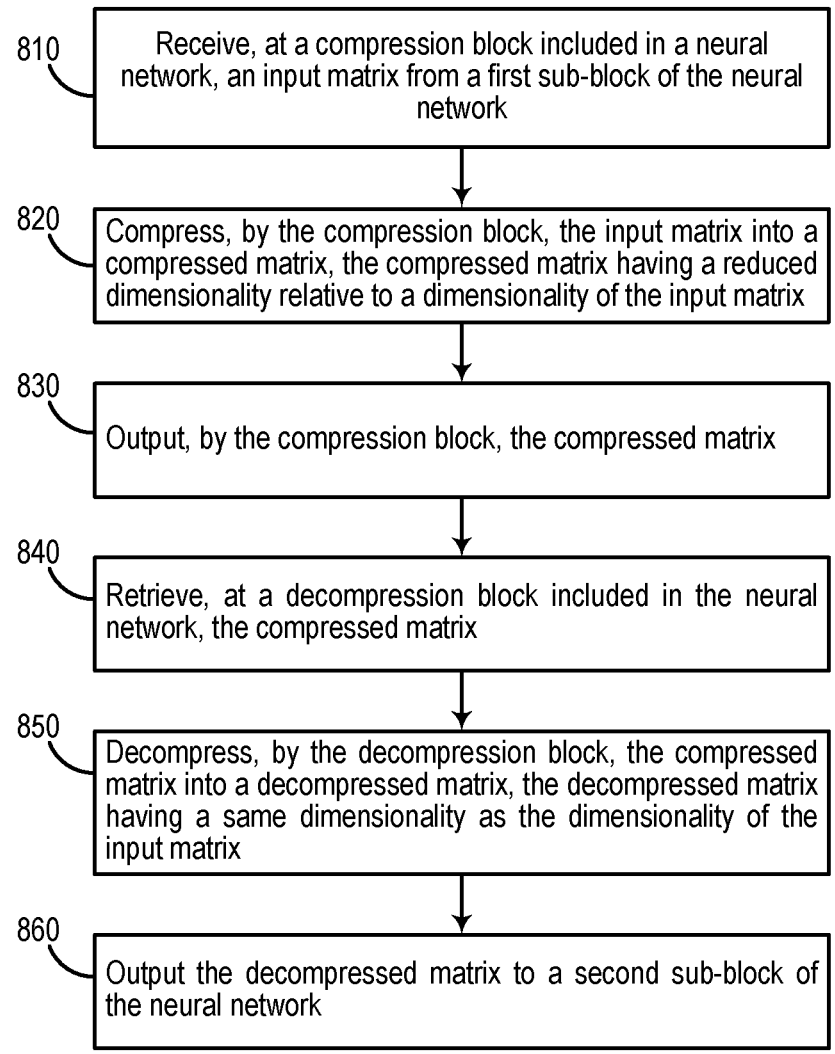
FIG. 8 illustrates a process for compressing and decompressing input matrices, according to some embodiments.

FIG. 8 illustrates a process 800 for compressing and decompressing input matrices, according to some embodiments. In some embodiments, neural network 300 of FIG.

3B performs process 800. Process 800 begins by receiving, at 810, an input matrix from a first sub-block of a neural network at a decompression block. The input matrix may be a query matrix or a key matrix and the first sub-block may be a query sub-block or key sub-block (e.g., query sub-block 304 and key sub-block 306 of FIG. 3B). The input matrix may have dimensions [B, S, H].

Next, process 800 compresses, at 820, the input matrix into a compressed matrix. The compressed matrix has a reduced dimensionality relative to a dimensionality of the input matrix. Referring to FIG. 4 as an example, compression block 326 compresses input matrix 400 having dimensions [B, S, H] into compressed matrix 402 having dimensions [B, S, K] with K being less than H. Process 800 then outputs, at 830, the compressed matrix. In some embodiments, process 800 communicates the compressed matrix to external memory for storage.

At 840, process 800 retrieves the compressed matrix at a decompression block in the neural network. Referring to FIG. 4 as an example, decompression block 332 retrieves compressed matrix 402 from external memory 330. Next, process 800 decompresses, at 850, the compressed matrix into a decompressed matrix. The decompressed matrix has a same dimensionality as the dimensionality of the input matrix. Referring to FIG. 4 as an example, decompression block 332 decompresses compressed matrix 402 having dimensions [B, S, K] into decompressed matrix 404 having dimensions [B, S, H]. Finally, process 800 outputs, at 860, decompressed matrix to a second sub-block of the neural network. Referring to FIG. 3B as an example, decompression block 332 outputs the decompressed matrix to operator sub-block 310.

Although the above description of compression and decompression blocks has been made with respect to transformer models, the present disclosure is not limited to such transformer models. The compression and decompression techniques described herein may be applied to any type of neural network model.

Figure 9:
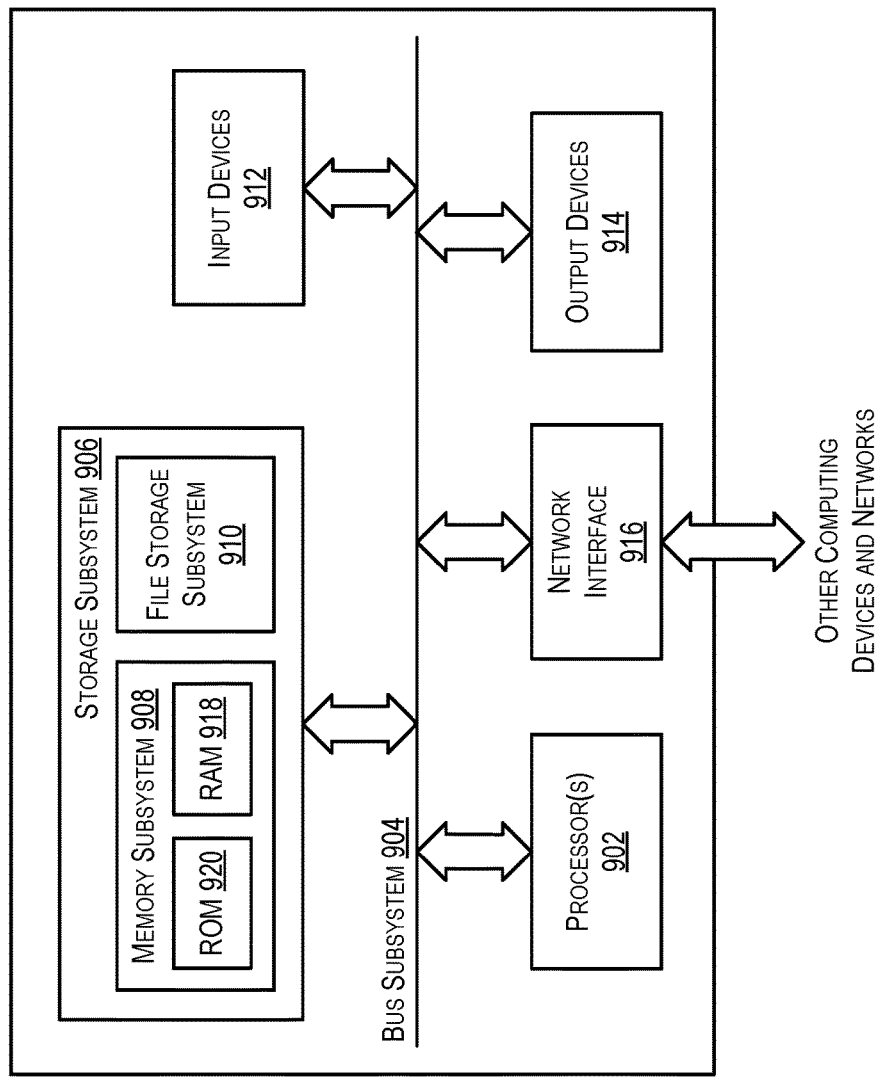
FIG. 9 depicts a simplified block diagram of an example computer system according to some embodiments.

The techniques describe above may be implemented in a wide range of computer systems configured to process neural networks. FIG. 9 depicts a simplified block diagram of an example computer system 900, which can be used to implement the techniques described in the foregoing disclosure. In some embodiments, computer system 900 may be used to implement system 100 or neural network 300. As shown in FIG. 9, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

Figure 10:
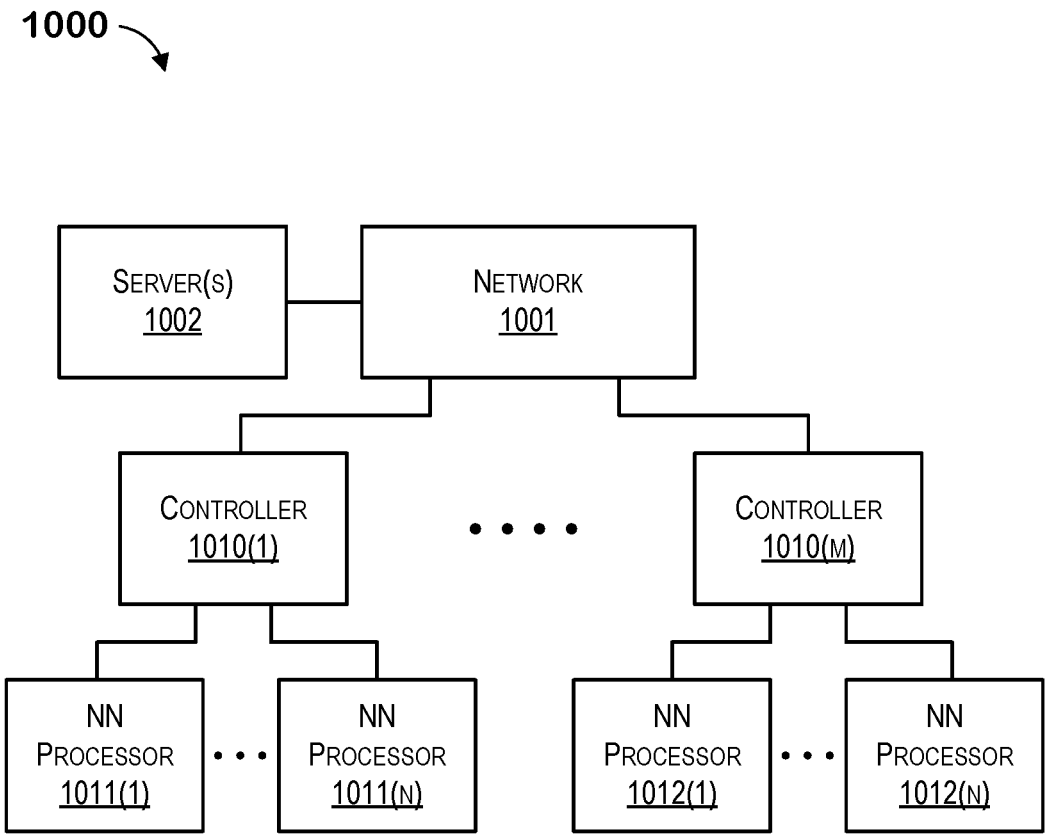
FIG. 10 illustrates a neural network processing system according to some embodiments.

FIG. 10 illustrates a neural network processing system according to some embodiments. In various embodiments, neural networks (e.g., neural network 300) according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1002, which may comprise architectures illustrated in FIG. 9 above, may be coupled to a plurality of controllers 1010(1)-1010(M) over a communication network 1001 (e.g. switches, routers, etc.). Controllers 1010(1)-1010(M) may also comprise architectures illustrated in FIG. 9 above. Each controller 1010(1)-1010(M) may be coupled to one or more NN processors, such as processing units 1011(1)-1011(N) and 1012(1)-1012(N), for example. NN processing units 1011(1)-1011(N) and 1012(1)-1012(N) may include a variety of configurations of functional processing blocks and memory optimized for neural network processing, such as training or inference. The NN processors are optimized for neural network computations. Server 1002 may configure controllers 1010 with NN models as well as input data to the models, which may be loaded and executed by NN processing units 1011(1)-1011(N) and 1012(1)-1012(N) in parallel, for example. Models may include layers and associated weights as described above, for example. NN processing units may load the models and apply the inputs to produce output results. NN processing units may also implement training algorithms described herein, for example.

FURTHER EXAMPLE EMBODIMENTS

In various embodiments, the present disclosure includes systems, methods, and apparatuses for compressing and decompressing data generated by sub-blocks in a neural network. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of processing units and a non-transitory machine-readable medium storing instructions that when executed by at least one processing unit in the set of processing units cause the at least one processing unit to receive, at a compression block included in a neural network, an input matrix from a first sub-block of the neural network; compress, by the compression block, the input matrix into a compressed matrix to reduce utilization of hardware resources when transmitting and storing the compressed matrix, the compressed matrix having a reduced dimensionality relative to a dimensionality of the input matrix; output, by the compression block, the compressed matrix; retrieve, at a decompression block included in the neural network, the compressed matrix; decompress, by the decompression block, the compressed matrix into a decompressed matrix, the decompressed matrix having a same dimensionality as the dimensionality of the input matrix; and output the decompressed matrix to a second sub-block of the neural network. The compression block learns to optimize said compressing and the decompression block learns to optimize said decompressing based on feedback received from the neural network.

In one embodiment, the compression block comprises a fully connected network (FCN). In this embodiment, compressing the input matrix includes multiplying, by the compression block, the input matrix with a set of matrices used to implement the FCN to produce the compressed matrix having the reduced dimensionality.

In one embodiment, compressing the input matrix also includes reshaping, by a reshape function of the compression block prior to said multiplying, the input matrix such that a number of columns in the input matrix is equal to a number of rows in a first matrix in the set of matrices.

In one embodiment, the compression block learns to optimize said compressing by adjusting weights in the set of matrices based on the feedback received from the neural network.

In one embodiment, the decompression block comprises an FCN. In this embodiment, the decompression block decompresses the compressed matrix by multiplying the compressed matrix with a set of matrices used to implement the FCN to produce the decompressed matrix.

In one embodiment, decompressing also includes reshaping, by a reshape function subsequent to said multiplying, the decompressed matrix such that the decompressed matrix has the same dimensionality as the dimensionality of the input matrix.

In one embodiment, the decompression block learns to optimize said decompressing by adjusting weights in the set of matrices based on the feedback received from the neural network.

In one embodiment, the input matrix has dimensions [B, S, H], where B represents a batch size, where S represents a sequence length, and where H represents a hidden size, wherein the compressed matrix has dimensions [B, S, K], where K is less than H, and wherein the decompressed matrix has dimensions [B, S, H].

In one embodiment, the instructions further cause the at least one processing unit to communicate the compressed matrix, via an input/output (I/O) interface of the system, to an external memory for storage; and retrieve, via the I/O interface, the compressed matrix from the external memory.

In one embodiment, the neural network is a transformer model. In this embodiment, a query sub-block, a key sub-block, or a value sub-block of an attention layer in the transformer model is the first sub-block.

In one embodiment, the instructions further cause the at least one processing unit to split the input matrix into a set of component matrices prior to said compressing. In this embodiment, compressing the input matrix includes individually compressing, by the compression block, each component matrix in the set of component matrices.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A system comprising:
a set of processing units; and
a non-transitory machine-readable medium storing instructions that when executed by at least one processing unit in the set of processing units cause the at least one processing unit to:
receive a first matrix in a transformer neural network configured to deduce meaning of a plurality of words represented in the first matrix;
receive, at a compression block included in the transformer neural network, a query matrix from a first query sub-block of the transformer neural network, wherein the first query sub-block generates the query matrix based on an embedded input sequence matrix, the query matrix comprising current word-position vectors in the input sequence;
compress, by the compression block, the query matrix into a compressed matrix to reduce utilization of hardware resources when transmitting and storing the compressed matrix, the compressed matrix having a reduced dimension along one of a plurality of dimensions of the query matrix;
output, by the compression block, the compressed matrix to an off-chip memory;
retrieve, by a decompression block included in the transformer neural network, the compressed matrix from the off-chip memory;
decompress, by the decompression block, the compressed matrix into a decompressed matrix, the decompressed matrix having a same dimension along said one of the plurality of dimensions as the query matrix; and
output the decompressed matrix to a second sub-block of the transformer neural network, the second sub-block performing a dot product of the decompressed matrix and a transpose of a key matrix to produce an attention weight matrix.

2. The system of claim 1, wherein the compression block comprises a fully connected network (FCN), wherein said compressing comprises:
multiplying, by the compression block, the query matrix with a set of matrices used to implement the FCN to produce the compressed matrix having the reduced dimensionality.

3. The system of claim 2, wherein said compressing further comprises:
reshaping, by a reshape function of the compression block prior to said multiplying, the query matrix such that a number of columns in the query matrix is equal to a number of rows in a first matrix in the set of matrices.

4. The system of claim 2, wherein the compression block learns to optimize said compressing by adjusting weights in the set of matrices based on the feedback received from the transformer neural network.

5. The system of claim 1, wherein the decompression block comprises an FCN, wherein said decompressing comprises:
multiplying, by the decompression block, the compressed matrix with a set of matrices used to implement the FCN to produce the decompressed matrix.

6. The system of claim 5, wherein said decompressing further comprises:
reshaping, by a reshape function subsequent to said multiplying, the decompressed matrix such that the decompressed matrix has the same dimensionality as the dimensionality of the query matrix.

7. The system of claim 5, wherein the decompression block learns to optimize said decompressing by adjusting weights in the set of matrices based on the feedback received from the transformer neural network.

8. The system of claim 1, wherein the query matrix has dimensions [B, S, H], where B represents a batch size, where S represents a sequence length, and where H represents a hidden size, wherein the compressed matrix has dimensions [B, S, K], where K is less than H, and wherein the decompressed matrix has dimensions [B, S, H].

9. The system of claim 1, wherein the instructions further cause the at least one processing unit to:
split the query matrix into a set of component matrices prior to said compressing;
wherein said compressing the query matrix comprises individually compressing, by the compression block, each component matrix in the set of component matrices.

10. A method comprising:
receiving a first matrix in a transformer neural network configured to deduce meaning of a plurality of words represented in the first matrix;
receiving, at a compression block included in the transformer neural network, a query matrix from a first query sub-block of the transformer neural network, wherein the first query sub-block generates the query matrix based on an embedded input sequence matrix, the query matrix comprising current word-position vectors in the input sequence;
compressing, by the compression block, the query matrix into a compressed matrix to reduce utilization of hardware resources when transmitting and storing the compressed matrix, the compressed matrix having a reduced dimension along one of a plurality of dimensions of the query matrix;
outputting, by the compression block, the compressed matrix to an off-chip memory;
retrieving, at a decompression block included in the transformer neural network, the compressed matrix from the off-chip memory;
decompressing, by the decompression block, the compressed matrix into a decompressed matrix, the decompressed matrix having a same dimension along said one of the plurality of dimensions as the query matrix; and
outputting the decompressed matrix to a second sub-block of the transformer neural network, the second sub-block performing a dot product of the decompressed matrix and a transpose of a key matrix to produce an attention weight matrix.

11. The method of claim 10, wherein the compression block comprises an FCN, and wherein said compressing comprises:
multiplying, by the compression block, the query matrix with a set of matrices used to implement the FCN to produce the compressed matrix having the reduced dimensionality.

12. The method of claim 10, wherein the decompression block comprises an FCN, wherein said decompressing comprises:
multiplying, by the decompression block, the compressed matrix with a set of matrices used to implement the FCN to produce the decompressed matrix.

13. The method of claim 10, wherein the query matrix has dimensions [B, S, H], where B represents a batch size, where S represents a sequence length, and where H represents a hidden size, wherein the compressed matrix has dimensions [B, S, K], where K is less than H, and wherein the decompressed matrix has dimensions [B, S, H].

14. A non-transitory machine-readable medium storing a program executable by at least one processing unit of a computer system, the program comprising sets of instructions for:
receiving a first matrix in a transformer neural network configured to deduce meaning of a plurality of words represented in the first matrix;
receiving, at a compression block included in the transformer neural network, a query matrix from a first query sub-block of the transformer neural network, wherein the first query sub-block generates the query matrix based on an embedded input sequence matrix, the query matrix comprising current word-position vectors in the input sequence;
compressing, by the compression block, the query matrix into a compressed matrix to reduce utilization of hardware resources when transmitting and storing the compressed matrix, the compressed matrix having a reduced dimension along one of a plurality of dimensions of the query matrix;
outputting, by the compression block, the compressed matrix to an off-chip memory;
retrieving, at a decompression block included in the transformer neural network, the compressed matrix from the off-chip memory;
decompressing, by the decompression block, the compressed matrix into a decompressed matrix, the decompressed matrix having a same dimension along said one of the plurality of dimensions as the query matrix; and
outputting the decompressed matrix to a second sub-block of the transformer neural network, the second sub-block performing a dot product of the decompressed matrix and a transpose of a key matrix to produce an attention weight matrix.

15. The non-transitory machine-readable medium of claim 14, wherein the decompression block comprises an FCN, and wherein the program further comprises sets of instructions for:
    multiplying, by the compression block, the query matrix with a set of matrices used to implement the FCN to produce the compressed matrix having the reduced dimensionality.

16. The non-transitory machine-readable medium of claim 14, wherein the decompression block comprises an FCN, and wherein the program further comprises sets of instructions for:
    multiplying, by decompression block, the compressed matrix with a set of matrices used to implement the FCN to produce the decompressed matrix.

* * * * *